(12) United States Patent
Slane et al.

(10) Patent No.: US 11,273,897 B2
(45) Date of Patent: Mar. 15, 2022

(54) ASYMMETRIC SURFACE LAYER FOR FLOOR PANELS

(71) Applicant: Goodrich Corporation, Charlotte, NC (US)

(72) Inventors: Casey Slane, Tallmadge, OH (US); Nathaniel Ching, Hartville, OH (US); Jin Hu, Hudson Village, OH (US); Galdemir Cezar Botura, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 279 days.

(21) Appl. No.: 16/026,377

(22) Filed: Jul. 3, 2018

(65) Prior Publication Data

US 2020/0010167 A1    Jan. 9, 2020

(51) Int. Cl.
| | |
|---|---|
| *H05B 3/20* | (2006.01) |
| *H05B 3/28* | (2006.01) |
| *B64C 1/18* | (2006.01) |
| *F24D 13/02* | (2006.01) |
| *H05B 3/22* | (2006.01) |
| *B32B 3/12* | (2006.01) |

(52) U.S. Cl.
CPC .............. *B64C 1/18* (2013.01); *F24D 13/024* (2013.01); *H05B 3/22* (2013.01); *B32B 3/12* (2013.01); *B32B 2262/101* (2013.01); *B32B 2274/00* (2013.01); *B32B 2307/202* (2013.01); *B32B 2307/204* (2013.01); *B32B 2307/558* (2013.01); *H05B 2203/026* (2013.01)

(58) Field of Classification Search
CPC ............ H05B 2203/026; H05B 1/0236; H05B 3/20–267; H05B 3/28–30
See application file for complete search history.

(56) References Cited

U.S. PATENT DOCUMENTS

| | | |
|---|---|---|
| 545,174 A | 8/1895 | Roadhouse |
| 554,773 A | 2/1896 | Cook |
| 580,679 A | 4/1897 | Davenport |

(Continued)

FOREIGN PATENT DOCUMENTS

| | | |
|---|---|---|
| EP | 1638371 A1 | 3/2006 |
| EP | 3015360 A1 | 5/2016 |

(Continued)

OTHER PUBLICATIONS

Extended European Search Report dated Nov. 29, 2019, issued during the prosecution of European Patent Application No. EP 19183571.9.

(Continued)

*Primary Examiner* — Michael A Laflame, Jr.
(74) *Attorney, Agent, or Firm* — Locke Lord LLP; Joshua L. Jones; Scott D. Wofsy

(57) ABSTRACT

A heater panel includes a core. A heater/dielectric layer including a positive thermal coefficient (PTC) heater layer between a pair of dielectric layers is bonded to the core in a stack. An impact layer is bonded to the stack, wherein the impact layer includes a first sub-layer for impact absorption that is bonded to the stack and a second sub-layer for cut resistance bonded to the first sub-layer. The second sub-layer has a higher material hardness than that of the first-sub layer.

10 Claims, 2 Drawing Sheets

(56) References Cited

U.S. PATENT DOCUMENTS

| | | |
|---|---|---|
| 6,429,157 B1 | 8/2002 | Kishi et al. |
| 6,519,835 B1 | 2/2003 | Von Arx et al. |
| 6,611,659 B2 | 8/2003 | Meisiek |
| 6,825,137 B2 | 11/2004 | Fu et al. |
| 6,834,159 B1 | 12/2004 | Schramm |
| 7,087,296 B2 | 8/2006 | Porter |
| 7,247,822 B2 | 7/2007 | Johnston |
| 7,800,028 B2 | 9/2010 | Wang |
| 8,158,245 B2 | 4/2012 | Pratte et al. |
| 8,286,919 B2 | 10/2012 | Gerken et al. |
| 8,523,113 B2 | 9/2013 | Atkinson |
| 8,752,279 B2 | 6/2014 | Brittingham et al. |
| 8,772,676 B2 | 7/2014 | Augustine et al. |
| 9,161,393 B2 | 10/2015 | Kaiserman et al. |
| 9,427,940 B2 | 8/2016 | Bremmer et al. |
| 9,493,894 B2 | 11/2016 | Butler et al. |
| 9,550,330 B2 | 1/2017 | Pratte et al. |
| 9,593,917 B2 | 3/2017 | Pilpel |
| 9,630,701 B2 | 4/2017 | Hu |
| 9,736,888 B2 | 8/2017 | Duce et al. |
| 9,782,944 B2 | 10/2017 | Martin et al. |
| 9,855,721 B2 | 1/2018 | Drexler et al. |
| 9,914,522 B2 | 3/2018 | Nehring |
| 9,939,087 B2 | 4/2018 | Kolarski et al. |
| 2006/0138279 A1 | 6/2006 | Pisarski |
| 2008/0210820 A1 | 9/2008 | Boeing |
| 2009/0011210 A1 | 1/2009 | Gao et al. |
| 2009/0236327 A1 | 9/2009 | Everly et al. |
| 2009/0266810 A1* | 10/2009 | Chivers ............... F24D 13/024 219/542 |
| 2010/0170889 A1* | 7/2010 | Keite-Telgenbuscher ................... C09J 7/38 219/546 |
| 2012/0234819 A1 | 9/2012 | Berger |
| 2014/0044914 A1 | 2/2014 | Kurtz et al. |
| 2014/0071216 A1 | 3/2014 | Hu et al. |
| 2015/0382403 A1* | 12/2015 | Philip ................... H05B 3/145 219/213 |
| 2016/0007474 A1 | 1/2016 | Dardona et al. |
| 2016/0121993 A1* | 5/2016 | Nehring .................... B64C 1/40 244/118.5 |
| 2016/0297509 A1 | 10/2016 | Estadieu et al. |
| 2016/0340020 A1 | 11/2016 | Owens et al. |
| 2016/0361889 A1 | 12/2016 | Bartolome |
| 2017/0050395 A1 | 2/2017 | Vos et al. |
| 2017/0158898 A1 | 6/2017 | Xiao et al. |
| 2017/0238369 A1 | 8/2017 | Owens et al. |
| 2017/0254065 A1 | 9/2017 | Hegenbart et al. |
| 2018/0050523 A1 | 2/2018 | Pilpel et al. |
| 2018/0057748 A1 | 3/2018 | Hochstetter et al. |
| 2018/0124874 A1 | 5/2018 | Dardona et al. |
| 2018/0127081 A1 | 5/2018 | Toral V zquez et al. |
| 2018/0176989 A1 | 6/2018 | Hu et al. |

FOREIGN PATENT DOCUMENTS

| | | |
|---|---|---|
| GB | 1444718 A | 8/1976 |
| JP | 4862913 B2 | 1/2012 |
| WO | 2012087294 A1 | 6/2012 |
| WO | 2017/186895 A1 | 11/2017 |

OTHER PUBLICATIONS

Extended European Search Report for EP Application No. 19183876.2, dated Oct. 25, 2019, pp. 5.
Extended European Search Report issued during the prosecution of European Patent Application No. 19183891.1 dated Nov. 4, 2019. (7 pages).
Extended European Search Report issued during the prosecution of European Patent Application No. 19184091.7 dated Nov. 28, 2019. (6 pages).
Extended European Search Report issued during the prosecution of European Patent Application No. 19182513.2 dated Nov. 28, 2019. (6 pages).

* cited by examiner

ASYMMETRIC SURFACE LAYER FOR FLOOR PANELS

BACKGROUND OF THE INVENTION

1. Field of the Invention

The present disclosure relates to heated panels, and more particularly to heated floor panels such in aircraft.

2. Description of Related Art

Positive thermal coefficient (PTC) materials increase in electrical resistance as their temperature rises. PCT materials are useful in heating panels such as used in heating air craft floors, due to their intrinsic limits on temperature. Carbon-based PTC heaters for aircraft floor panels are traditionally fabricated by screen printing a PTC-based ink in a desired heating element pattern as a layer in a series of layers making up the panel. Screen printing requires preparation of the screen, and an excess amount of ink is required for the screen printing process, i.e. more ink must go into the process than actually ends up in the floor panel. The balance of the ink used in the process must be disposed of.

Aircraft floor panels are subject to a wide variety of impacts from dropped objects both sharp and blunt in nature. A floor panel must also be resistant to knife cuts as part of installation and maintenance of the floor panel. A floor panel's ability to withstand both impact and knife cuts is important for promoting a robust floor panel. Traditional surface layer materials used in composite panels are usually unable to withstand repeated or high load impacts as well as knife cuts.

The conventional techniques have been considered satisfactory for their intended purpose. However, there is an ever present need for improved heated panels and process for making the same. This disclosure provides a solution for this need.

SUMMARY OF THE INVENTION

A heater panel includes a core. A heater/dielectric layer including a positive thermal coefficient (PTC) heater layer between a pair of dielectric layers is bonded to the core in a stack. An impact layer is bonded to the stack, wherein the impact layer includes a first sub-layer for impact absorption that is bonded to the stack and a second sub-layer for cut resistance bonded to the first sub-layer. The second sub-layer has a higher material hardness than that of the first-sub layer.

The core can include at least one of a honeycomb structure and/or a foam material. A first structural facing can be bonded to the heater/dielectric layer opposite the core. A second structural facing can be bonded to the core opposite the heater/dielectric layer so that the second structural facing is spaced apart from the heater/dielectric layer by the core. The first structural facing and the second structural facing can each include carbon fiber impregnated with a resin, wherein the resin includes at least one of a thermoplastic material and/or a thermoset material.

The first sub-layer of the impact layer can include at least one of a thermoplastic, elastomer, and/or resin. The second sub-layer of the impact layer can include at least one of a thermoplastic, glass, and/or ballistic fibers.

A method of making a heater panel includes bonding a heater/dielectric layer to a core to form a stack. The method includes bonding a first sub-layer for impact absorption to a second sub-layer for cut resistance to form an impact layer. The method includes bonding the impact layer to the stack.

The method can include bonding a first structural facing to the heater/dielectric layer opposite the core. The method can include bonding a second structural facing to the core opposite the heater/dielectric layer so that the second structural facing is spaced apart from the heater/dielectric layer by the core. Bonding the impact layer to the stack can include bonding the impact layer to the first structural facing.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
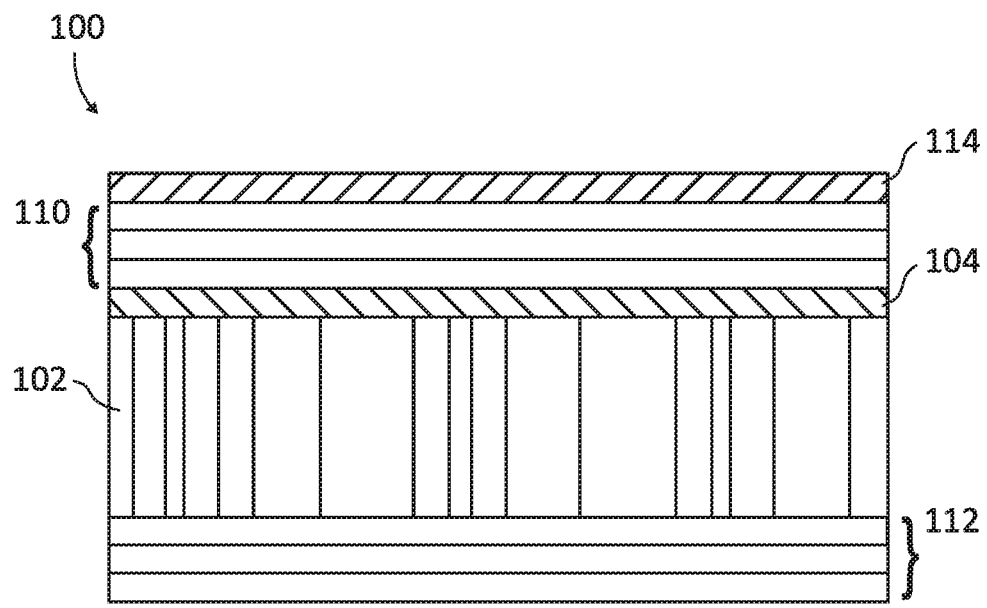
FIG. 1 is a schematic cross-sectional view of an exemplary embodiment of a heater panel constructed in accordance with the present disclosure, showing the heater/dielectric layer and the impact layer bonded in a stack.

Reference will now be made to the drawings wherein like reference numerals identify similar structural features or aspects of the subject disclosure. For purposes of explanation and illustration, and not limitation, a partial view of an exemplary embodiment of a heater panel in accordance with the disclosure is shown in FIG. 1 and is designated generally by reference character 100. Other embodiments of heater panels in accordance with the disclosure, or aspects thereof, are provided in FIGS. 2-4, as will be described. The systems and methods described herein can be used to provide heater panels, e.g., for aircraft floors and other surfaces including contoured surfaces.

Figure 2:
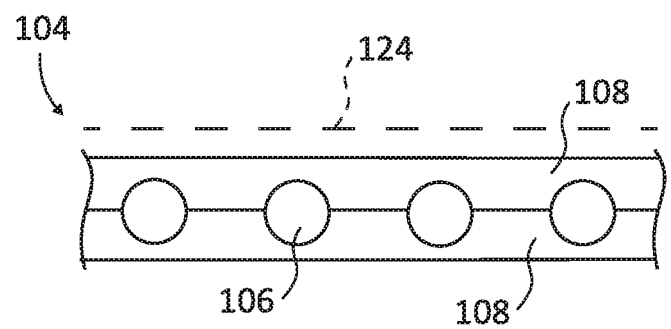
FIG. 2 is a schematic cross-sectional view of the heater/dielectric layer of FIG. 2, showing the dielectric layers.

The heater panel 100 includes a core 102 and a heater/dielectric layer 104. As shown in FIG. 2, the heater/dielectric layer 104 is an assembly that includes a positive thermal coefficient (PTC) heater layer 106 between a pair of dielectric layers 108. The core 102 can include at least one of a honeycomb structure and/or a foam material.

A first structural facing 110 is bonded to the heater/dielectric layer 104, although optionally, a second core like core 102 can be included between the heater/dielectric layer 104 and the first structural facing 110. A second structural facing 112 is bonded to the core 102 opposite from the heater/dielectric layer 104 so that the second structural facing 112 is spaced apart from the heater/dielectric layer 104 by the core 102. The first structural facing 110 and the second structural facing 112 each include carbon fiber impregnated with a resin, wherein the resin includes at least one of a thermoplastic material (such as PEEK, PC, PPS, and PEI) and/or a thermoset material (such as epoxy, phenolic, bis-maleimide resins (BMI), and benzoxazine).

Figure 3:
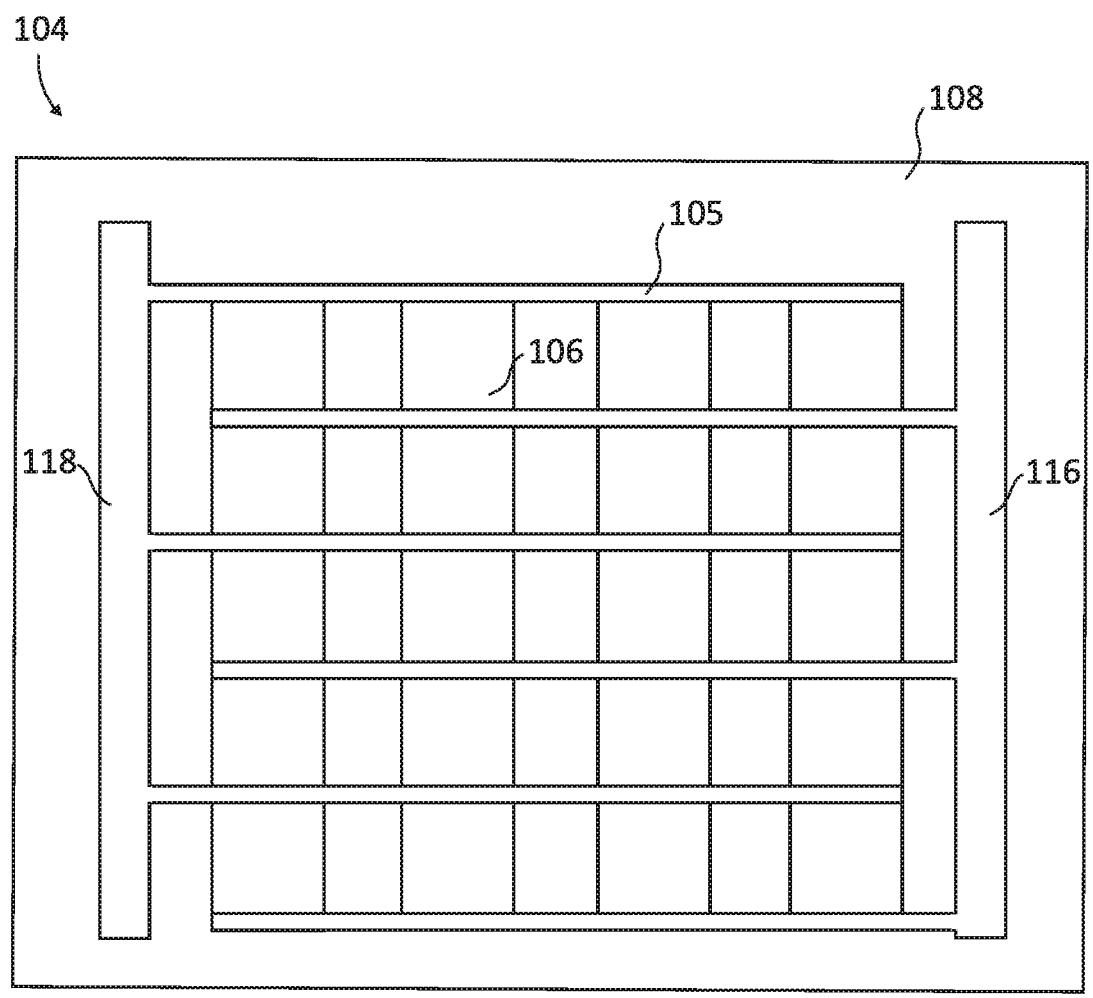
FIG. 3 is a schematic planar view of a portion of the heater panel of FIG. 1, showing the heater element pattern of the heater/dielectric layer.

FIG. 3 shows an exemplary heating element pattern for the PTC heater layer 106, which has multiple redundant electrical pathways for current to flow from one bus bar 116 to the other bus bar 118. As shown in FIG. 2, with the heater element pattern, there are places in the heater/dielectric layer 104 where the dielectric layers 108 directly contact one another, and other places where the actual heater element of the PTC heater layer 106 is sandwiched between the dielectric layers 108. Those skilled in the art will readily appreciate that heater element pattern shown in FIG. 3 is exemplary only, and that any other suitable pattern can be used without departing from the scope of this disclosure.

Figure 4:
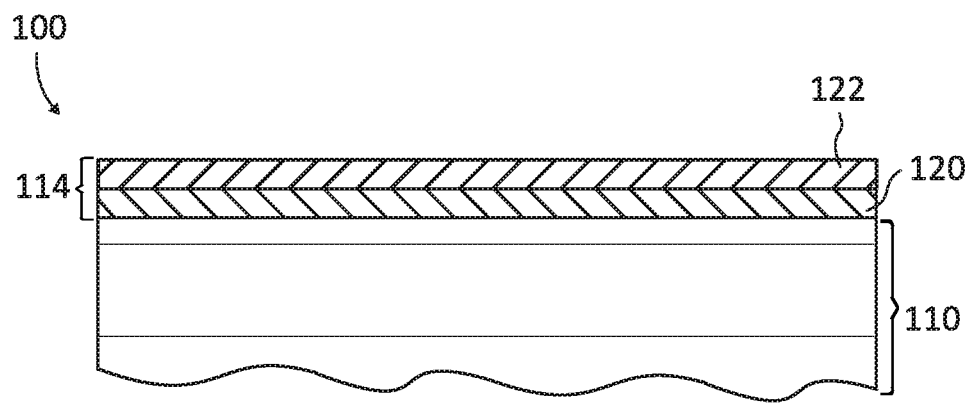
FIG. 4 is a schematic cross-sectional view of a portion of the heater panel of FIG. 1, schematically showing the sub-layers of the impact layer.

With reference again to FIG. 1, the impact layer 114 is bonded to the stack that includes the core 102 and the heater/dielectric layer 104. The impact layer 114 is bonded to the first structural facing 110 opposite the heater/dielectric layer 104. As shown in FIG. 4, the impact layer 114 includes a first sub-layer 120 for impact absorption that is bonded to the stack, e.g. directly bonded to the first structural facing 110, and a second sub-layer 122 for cut resistance that is bonded to the first sub-layer 120. The second sub-layer 122 has a higher material hardness than that of the first sub-layer 120. The first sub-layer 120 of the impact layer 114 can include at least one of a thermoplastic, elastomer, and/or resin. The second sub-layer 122 of the impact layer 114 can include at least one of a thermoplastic, glass, and/or ballistic fibers. The first sub-layer 120 is an impact absorbing section that has energy dissipation properties. The impact absorbing section can be made of softer materials such as thermoplastics with high elongation. The second sub-layer 122 is a cut resistant layer. The cut resistant layer can include hard materials, e.g. to blunt the force of the edge of a knife.

A composite impact layer 114, including the two sub-layers 120 and 122, combines the properties of the two sub-layers 120 and 122. Mixing the materials of the two sub-layers 120 and 122 (as opposed to keeping the two sub-layers as distinct layers) usually does not have the desired effect because the resulting mixed material is limited in both aspects of impact and cut resistance. The benefit is that an asymmetric impact layer 114, e.g. with two separate materials in the respective sub-layers 120 and 122, can achieve the same level of impact resistance and cut resistance at a lighter weight than a single material.

A method of making a heater panel, e.g., heater panel 100, includes bonding a heater/dielectric layer, e.g. heater/dielectric layer 104, to a core, e.g. core 102, to form a stack. The method includes bonding a first sub-layer, e.g., sub-layer 120, for impact absorption to a second sub-layer, e.g., sub-layer 122, for cut resistance to form an impact layer, e.g. impact layer 114. The method includes bonding the impact layer to the stack.

The method includes bonding a first structural facing, e.g., first structural facing 110, to the heater/dielectric layer opposite the core The method includes bonding a second structural facing, e.g., second structural facing 112, to the core opposite the heater/dielectric layer so that the second structural facing is spaced apart from the heater/dielectric layer by the core. The method includes bonding an impact layer, e.g., impact layer 114, to the first structural facing opposite the core.

The method can include direct writing a close out layer 124, labeled in FIG. 3, to the heater/dielectric layer 104 for bonding the second core 103 to thereto. Other layers such as the impact layer 114 and the second structural facing 112 can be bonded to the respective surfaces of the heater panel 100 as required using film adhesives or the like.

The impact layer 114 forms an asymmetric surface layer that can withstand both impacts and knife cuts. This asymmetric surface layer is comprised of two distinct sections, a knife cut resistant upper section including the second sub-layer 122 and an impact resistant lower section including the first sub-layer 120. The asymmetric nature of this this layering can maximize the strain of the lower impact section improving impact resistance as compared to a symmetric layer with a knife cut resistant layer in the middle of a stack, which can limit strain. Those skilled in the art will readily appreciate that in addition to or in lieu of close out layer 124 and film adhesives, sections of the heater panel 100 can be laminated or bonded to form the asymmetric surface layer and can be laminated on, bonded on, or co-cured with the panel structure of heater panel 100.

The methods and systems of the present disclosure, as described above and shown in the drawings, provide for heater with superior properties relative to traditional heater panels including reduced use of PTC ink, the ability to make heater panels that are contoured, improved knife cut ant impact resistance, lighter weight, longer life and improved robustness. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A heater panel comprising:
   a core;
   a heater/dielectric layer including a positive thermal coefficient (PTC) heater layer between a pair of dielectric layers, wherein the heater/dielectric layer is bonded to the core in a stack; and
   an impact layer bonded to the stack, wherein the impact layer includes a first sub-layer for impact absorption that is bonded to the stack and a second sub-layer for cut resistance bonded to the first sub-layer, wherein the second sub-layer has a higher material hardness than that of the first-sub layer, wherein the second sub-layer of the impact layer includes at least one of a thermoplastic and/or glass, further comprising:
   a first structural facing bonded to the heater/dielectric layer opposite the core; and
   a second structural facing bonded to the core opposite the heater/dielectric layer so that the second structural facing is spaced apart from the heater/dielectric layer by the core, wherein the first structural facing is bonded directly to the heater/dielectric layer without an intervening core layer.

2. The heater panel as recited in claim 1, wherein the core includes at least one of a honeycomb structure and/or a foam material.

3. The heater panel as recited in claim 1, wherein the first structural facing and the second structural facing each include carbon fiber impregnated with a resin, wherein the resin includes at least one of a thermoplastic material and/or a thermoset material.

4. The heater panel as recited in claim 1, wherein the impact layer is bonded to the first structural facing.

5. The heater panel as recited in claim 1, wherein the first sub-layer of the impact layer includes at least one of a thermoplastic, elastomer, and/or resin.

6. A heater panel comprising:
a core;
a heater/dielectric layer including a positive thermal conductive coefficient (PTC) heater layer between a pair of dielectric layers, wherein the heater/dielectric layer is bonded to the core in a stack; and
a impact layer bonded to the stack, wherein the impact layer includes a first sub-layer for impact absorption that is bonded to the stack and a second sub-layer for cut resistance bonded to the first sub-layer, wherein the second sub-layer has a higher material hardness than that of the first-sub layer, wherein the second sub-layer of the impact layer includes at least one of a thermoplastic and/or glass, further comprising:
a first structural facing bonded to the heater/dielectric layer opposite the core; and
a second structural facing bonded to the core opposite the heater/dielectric layer so that the second structural facing is spaced apart form the heater/dielectric layer by the core, wherein the core is the only core in the heater panel.

7. The heater panel as recited in claim 6, wherein the core includes at least one of a honeycomb structure and/or a foam material.

8. The heater panel as recited in claim 6, wherein the first structural facing and the second structural facing each include carbon fiber impregnated with a resin, wherein the resin includes at least one of a thermoplastic material and/or a thermoset material.

9. The heater panel as recited in claim 6, wherein the impact layer is bonded to the first structural facing.

10. The heater panel as recited in claim 6, wherein the first sub-layer of the impact layer includes at least one of a thermoplastic, elastomer, and/or resin.

* * * * *